United States Patent
Kang et al.

(10) Patent No.: US 8,630,760 B2
(45) Date of Patent: Jan. 14, 2014

(54) METHOD FOR MANAGING TRANSITIONS IN INTERNAL COMBUSTION ENGINES WITH A HYBRID DRIVE POWERTRAIN

(75) Inventors: Jun-Mo Kang, Ann Arbor, MI (US); Man-Feng Chang, Troy, MI (US); Chen-Fang Chang, Troy, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 450 days.

(21) Appl. No.: 12/852,921

(22) Filed: Aug. 9, 2010

(65) Prior Publication Data

US 2012/0035793 A1 Feb. 9, 2012

(51) Int. Cl.
*B60L 11/14* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| 7,370,616 | B2 * | 5/2008 | Kuo et al. .................. 123/90.15 |
| 2003/0230441 | A1 | 12/2003 | Teraji et al. |
| 2007/0113541 | A1 * | 5/2007 | Jankovic ......................... 60/285 |
| 2007/0205028 | A1 * | 9/2007 | Leone et al. ................. 180/65.2 |
| 2009/0048757 | A1 * | 2/2009 | Chang et al. .................. 701/102 |
| 2009/0099751 | A1 * | 4/2009 | Kuzuyama .................... 701/102 |
| 2009/0229562 | A1 * | 9/2009 | Ramappan et al. ........... 123/295 |

FOREIGN PATENT DOCUMENTS

DE 10 2006 060 818 A1 9/2007

OTHER PUBLICATIONS

U.S. Appl. No. 12/503,968, Munukur, et al.

* cited by examiner

*Primary Examiner* — Tuan C. To
*Assistant Examiner* — Aaron L Troost (57) ABSTRACT

A method for controlling combustion mode transitions for an engine of a hybrid powertrain includes commanding an increase in engine torque, adjusting motor torque output from a torque machine responsive to the operator torque request and the commanded increase in engine torque, executing the combustion mode transition, and operating the torque machine in a torque reclamation state.

14 Claims, 3 Drawing Sheets

METHOD FOR MANAGING TRANSITIONS IN INTERNAL COMBUSTION ENGINES WITH A HYBRID DRIVE POWERTRAIN

TECHNICAL FIELD

This disclosure relates to a hybrid powertrain system with an engine operable in two discrete combustion modes and a torque generating device.

BACKGROUND

The statements in this section merely provide background information related to the present disclosure and may not constitute prior art.

Known spark-ignition engines introduce an air/fuel mixture into each cylinder which is compressed in a compression stroke and ignited by a spark plug. Known compression-ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. The HCCI combustion includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

In engine operation, the engine airflow is controlled by selectively adjusting position of the throttle valve and opening and closing of intake valves and exhaust valves. On engine systems so equipped, opening and closing of the intake valves and exhaust valves can be adjusted using a variable valve actuation system that includes variable cam phasing and a selectable multi-step valve lift, e.g., multiple-step cam lobes which provide two or more valve lift positions. In contrast to the throttle position change, the change in valve position of the multi-step valve lift mechanism is a discrete change, and not continuous.

When an engine operates in a HCCI combustion mode, the engine operates at a lean or stoichiometric air/fuel ratio operation with the throttle wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

In an engine configured to operate in SI and HCCI combustion modes, transitioning between combustion modes can be complex. The engine control module must coordinate actuations of multiple devices in order to provide a desired air/fuel ratio for the different modes. During a transition between a HCCI combustion mode and SI combustion mode, valve lift switching occurs nearly instantaneously, while adjustments to cam phasers and pressures in the manifold have slower dynamics. Until the desired air/fuel ratio is achieved, incomplete combustion and misfire can occur, leading to torque disturbances.

SUMMARY

A hybrid powertrain system includes an internal combustion engine and a torque machine configured to transfer torque to a driveline. The internal combustion engine is configured to operate in one of a homogeneous charge compression-ignition combustion mode and a spark-ignition combustion mode. A method for controlling operation of the hybrid powertrain system includes monitoring an operator torque request, monitoring engine operational parameters, commanding the internal combustion engine to transition from a first combustion mode to a second combustion mode. The internal combustion engine is transitioned from the first combustion mode to the second combustion mode including commanding an increase in engine torque, commanding a motor torque output from the torque machine responsive to the operator torque request and the commanded increase in engine torque, and then executing a transition of the internal combustion engine from the first combustion mode to the second combustion mode. The torque machine is operated in a torque reclamation state responsive to the commanded motor torque output from the torque machine during the transitioning of the internal combustion engine from the first combustion mode to the second combustion mode.

BRIEF DESCRIPTION OF THE DRAWINGS

One or more embodiments will now be described, by way of example, with reference to the accompanying drawings, in which.

DETAILED DESCRIPTION

Figure 1:
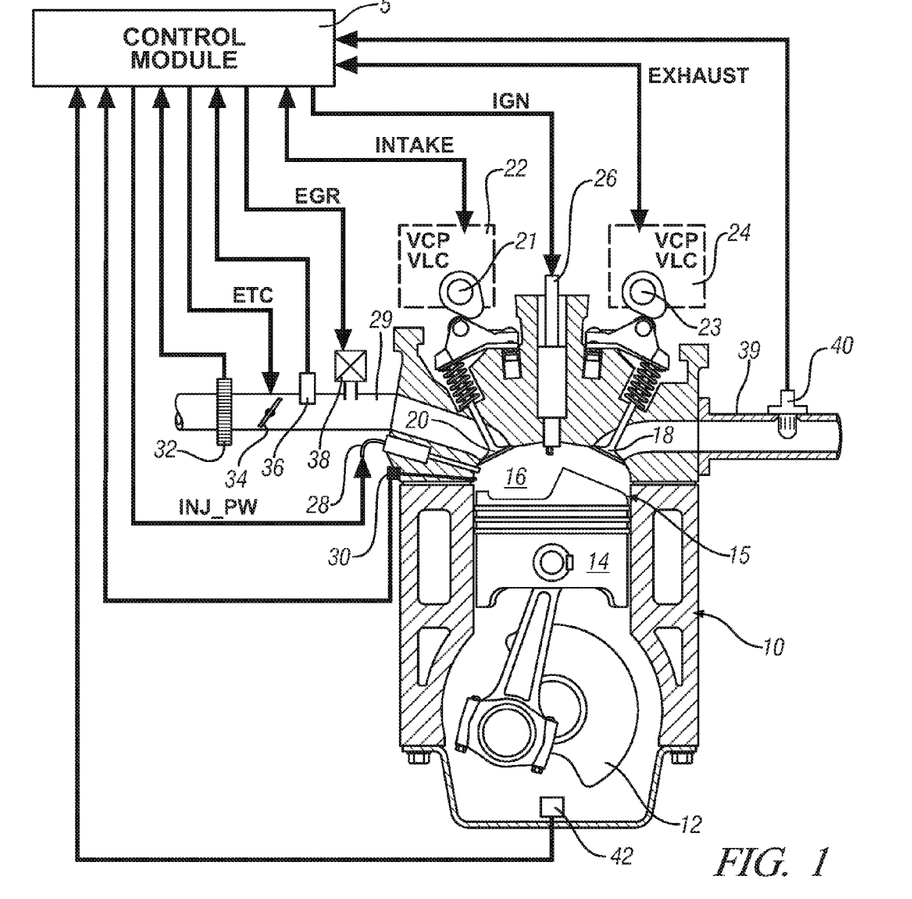
FIG. 1 is a schematic depiction of an internal combustion engine and of an accompanying control module, in accordance with the present disclosure.

Referring now to the drawings, wherein the depictions are for the purpose of illustrating certain exemplary embodiments only and not for the purpose of limiting the same, FIG. 1 is a schematic drawing of a section view of an internal combustion engine 10 and an accompanying control module 5 that have been constructed in accordance with an embodiment of this disclosure. The engine 10 is selectively operative in a plurality of combustion modes, including a homogeneous charge compression-ignition (HCCI) combustion mode and a homogeneous spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 and variably adjust and control phasing (VCP) of the intake camshaft 21 for each cylinder 15 in response to a control signal (INTAKE) from the control module 5. The exhaust VCP/VLC device 24 preferably includes a controllable mechanism operative to variably switch and control valve lift (VLC) of the exhaust valve(s) 18 and variably adjust and control phasing (VCP) of the exhaust camshaft 23 for each cylinder 15 in response to a control signal (EXHAUST) from the control module 5.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal (INJ_PW) from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., speed and crank angle, in one embodiment a combustion sensor 30 configured to monitor combustion, and an exhaust gas sensor 40 configured to monitor exhaust gases, typically an air/fuel ratio sensor. The combustion sensor 30 has a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. However, combustion phasing may also be determined by similar methods as may be known by those of ordinary skill in the art. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, exhaust gas fractions, and non-intrusive cylinder pressure sensors.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine an operator torque request. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation in the HCCI combustion mode, the throttle valve 34 is preferably substantially wide-open, with the engine 10 controlled at a lean or stoichiometric air/fuel ratio. The intake and exhaust valves 20 and 18 are in the low-lift valve open position and the intake and exhaust lift timing operate with NVO. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of cylinder air charge. One or more fuel injection events can be executed during an engine cycle including at least one injection during a compression phase.

During engine operation in the homogeneous spark-ignition combustion (SI) mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark-ignition is preferably discharged at a predetermined time subsequent to the fuel injection when air charge within the cylinder is substantially homogeneous.

The control module 5 transitions engine operation to the preferred combustion mode associated with the engine 10 to increase fuel efficiencies and engine stability, and/or decrease emissions. A change in one of the engine operating parameters, e.g., speed and load, can effect a change in an engine operating zone. The control module 5 commands a transition to the preferred combustion mode associated with a change in the engine operating zone.

During combustion mode transitions, the engine 10 is controlled to operate at a preferred air/fuel ratio and the intake airflow is controlled to achieve the preferred air/fuel ratio. This includes estimating a cylinder air charge based upon engine operation in the target combustion mode. The throttle valve 34 and intake and exhaust VCP/VLC devices 22 and 24 are controlled to achieve an intake air flowrate based upon the estimated cylinder air charge, including during the transition between the homogeneous spark-ignition and HCCI combustion modes. The magnitude of airflow is controlled by adjusting the position of the throttle valve 34 and adjusting the intake and exhaust VCP/VLC devices 22 and 24 to control the opening timing and profiles of the intake and exhaust valve(s) 20 and 18. Operation in the two combustion modes require different settings for the intake and exhaust VCP/VLC devices 22 and 24 in terms of valve timing and profiles of the intake and exhaust valve(s) 20 and 18 and the throttle valve 34 for throttle position.

When a transition from the homogeneous spark-ignition combustion mode to the HCCI combustion mode is commanded, the control module 5 commands the throttle 34 to open to a wide open throttle (WOT) position and commands the intake and exhaust VCP/VLC systems 22 and 24 to adjust the intake and exhaust cams to preferred operational positions. Airflow subsequently increases due to the increasing manifold pressure and fuel mass increases accordingly to maintain stoichiometric air-fuel ratio, thus increasing engine torque. When the intake manifold pressure achieves a pressure that allows robust HCCI combustion, the VLC portion of the intake and exhaust VCP/VLC systems 22 and 24 switch the intake and exhaust valves 20 and 18 from high lift valve open positions to low-lift valve open positions. The preferred intake and exhaust cam positions are selected such that airflow disruption is minimized during the valve lift switching event and stoichiometric air-fuel ratio is continuously achieved in the HCCI combustion mode.

When a transition from the HCCI combustion mode to the homogeneous spark-ignition combustion mode is commanded, the control module 5 commands the intake and exhaust VCP/VLC systems 22 and 24 to adjust phasing of the intake camshaft 21 and exhaust camshaft 23 to increase air flow until the intake camshaft 21 and exhaust camshaft 23 reach preferred positions. Fuel mass subsequently increases to achieve stoichiometric air-fuel ratio, thus increasing engine torque. The intake and exhaust VCP/VLC systems 22 and 24 switch the intake and exhaust valves 20 and 18 from the low-lift valve open position to the high-lift valve open position when the intake camshaft 21 and exhaust camshaft 23 reach the preferred phasing positions. The preferred intake camshaft 21 and exhaust camshaft 23 phasing positions are selected such that airflow disruption is minimized during a valve lift switching event and a stoichiometric air-fuel ratio is continuously achieved in the homogeneous spark-ignition combustion mode.

The control module 5 adjusts the throttle 34 and signals the intake and exhaust VCP/VLC systems 22 and 24 to adjust cam phasing. These actuator changes affect the intake manifold pressure and valve open times to achieve a desired cylinder air charge. The desired cylinder air charge is determined based on the fuel mass injected and a desired air/fuel ratio, which is at one of a stoichiometric air/fuel ratio and a lean air/fuel ratio depending on the selected combustion mode. During the combustion mode transition, the control module 5 may operate one or more torque machines to react the torque output of the engine 10, as explained below, to promote smooth transitions.

Figure 2:
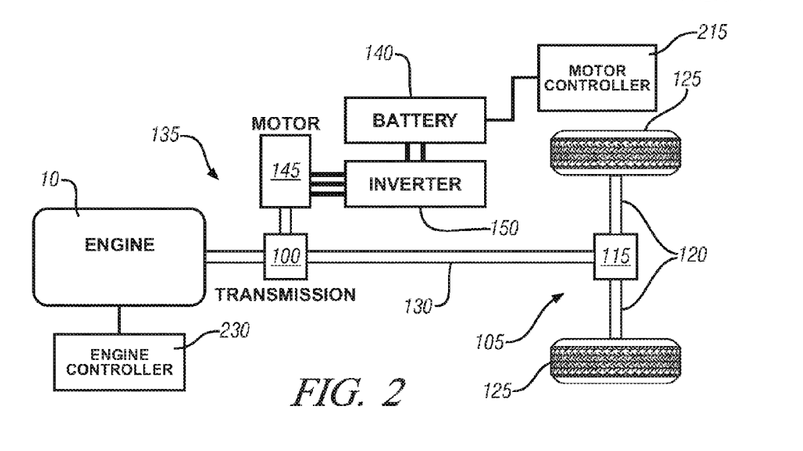
FIG. 2 is a schematic depiction of a hybrid powertrain utilizing one embodiment of the engine and a torque machine, in accordance with the present disclosure.

FIG. 2 is a schematic depiction of a hybrid powertrain system 135 utilizing one embodiment of the engine 10 and a torque machine 145. It should be noted that the specifics of the hybrid powertrain are illustrative and should not be considered restrictive. The engine 10 is controlled by an engine controller 230, which is controlled by the control module 5, and can be coupled to a transmission device 100 to selectively transmit tractive power to a driveline 105 of a vehicle. The driveline 105 includes a differential gear device(s) 115 that mechanically couples to an axle(s) 120 or a half-shaft(s) that mechanically couples to a wheel(s) 125 in one embodiment. The differential gear device 115 is coupled to an output member 130 of the hybrid powertrain system. The driveline 105 transfers tractive power between the transmission 100 and a road surface via the wheel(s) 125.

The hybrid powertrain system 135 includes an energy storage device (ESD) 140, which is depicted as a battery that stores potential energy and is coupled to one or more torque machine(s) 145, depicted as an electric motor, to transfer power therebetween. When the ESD 140 and the torque machine(s) 145 include electric motor/generators, controllable power inverter(s) 150 can be placed therebetween and used to transform electric power from direct current to alternating current and back again. A motor controller 215 controls the torque machine(s) 145 through control of the inverter (s) 150 and is controlled by the control module 5. The torque machine(s) 145 converts stored potential energy to mechanical power and convert mechanical power to potential energy while in an electric power generation mode that can be stored in the ESD 140. The engine 10 is operative to convert vehicle stored fuel to mechanical power.

Mechanical power from the engine 10 can be transferred to the transmission 100. Mechanical power can be transferred between the torque machine(s) 145 and the transmission 100. Mechanical power can be transferred between the driveline 105 and the transmission 100 via the output member 130. Mechanical power can be transferred between the engine 10 and the transmission 100. The transferred mechanical power can be in the form of tractive torque for vehicle propulsion, and in the form of reactive torque for vehicle braking associated with regenerative braking functionality. As will be apparent to one of ordinary skill in the art, although electrically powered torque machine(s) 145 are depicted and discussed in detail, other torque devices may be utilized, e.g., hydraulic or mechanical. Additionally, it will be apparent that other hybrid configurations may be used, e.g., series hybrid, parallel hybrid, or compound hybrid drive, without varying from the scope of the disclosure.

The engine 10 is utilized in combination with the torque machine(s) 145 for transferring torque to the driveline 105 thereby providing tractive torque through the wheel(s) 125. When the engine 10 is operating in the HCCI combustion mode, combustion phasing is affected by the cylinder charge temperature and composition. It is therefore desirable to maintain a cylinder charge temperature and composition for a respective combustion phasing which has a direct correlation to engine torque. When the charge temperature and composition are not met for a particular combustion phasing request, combustion ringing and audible combustion noise may result. Combustion ringing may be a limiting factor to engine operation in the HCCI combustion mode, including engine operating points associated with high load, high speed conditions and fast transient conditions. Furthermore, a speed/load operating range of the engine 10 in the HCCI combustion mode may be limited due to the magnitude of audible combustion noise, and resulting in transitioning the engine 10 to operate in the spark-ignition combustion mode.

The torque machine(s) 145 can be operated in an electric power generation mode to react torque from the drivetrain 105 to spin the torque machine(s) 145 as an electric power generator. Operation of the torque machine(s) 145 in the electric power generation mode results in the generating potential energy that may be transferred and stored within the ESD 140 for future use. Excess torque from the drivetrain 105 may be from, for example, regenerative braking forces or mode transition events.

Figure 3:
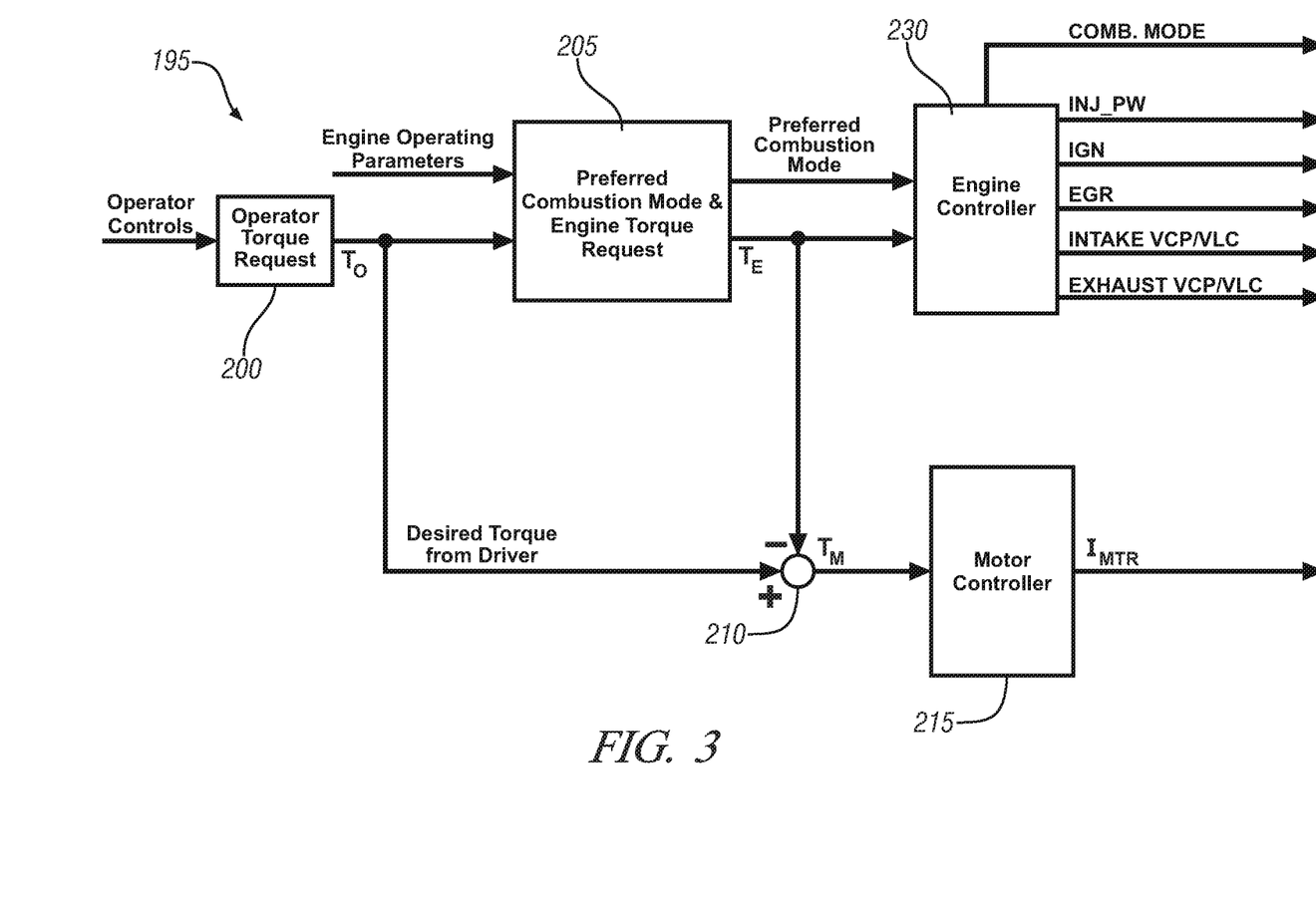
FIG. 3 depicts a schematic control diagram for controlling a hybrid powertrain system including an engine operating in HCCI combustion mode during a mode transition event, in accordance with the present disclosure.

FIG. 3 schematically depicts a control scheme 195 depicting controlling a hybrid powertrain system, e.g., the hybrid powertrain system 135 configured to operate in one of at least two combustion modes, e.g., HCCI and spark-ignition combustion modes, during a mode transition event. The control scheme 195 is preferably executed in the control module 5 as algorithmic code. In one embodiment, operator controls, e.g., throttle and brake controls, are continually monitored to determine an operator torque request $T_O$ (200). The operator torque request $T_O$ and engine operating parameters, e.g., engine speed and engine load, are used to select a preferred combustion mode and an engine torque request $T_E$ (205). Commands including the engine torque request $T_E$ and the preferred combustion mode are used by the engine controller 230 to operate the engine 10 accordingly.

The preferred combustion mode corresponds to engine operating conditions, e.g., when the engine 10 is in an operating range suitable for HCCI combustion, the preferred combustion mode is the HCCI combustion mode and the control module 5 commands operation within HCCI combustion mode. Similarly, when the engine 10 is in an operating range no longer suitable for HCCI combustion, the preferred combustion mode is the spark-ignition combustion mode and the control module 5 commands operation of the engine 10 in the spark-ignition combustion mode. When the engine 10 is operating in one of the combustion modes and it is determined that the other combustion mode is the preferred combustion mode, the control module 5 commands a combustion mode transition. The combustion mode transition includes sending an engine torque request $T_E$ to command an increase in engine torque output. The engine controller 230 operates the engine 10 to increase airflow and create a corresponding increase in fuel load and therefore torque.

The engine torque request $T_E$ and operator torque request $T_O$ are used to determine a motor torque request $T_M$ (210) if the engine torque request $T_E$ is above the operator torque request $T_O$ and begins a torque reclamation event if so determined. The torque reclamation event begins when the motor control module 215 receives the motor torque request $T_M$ and operates the motor 145 to react the motor torque request $T_M$ to potential energy which can be stored within the ESD 140 or be immediately used by other vehicle systems. The engine controller 230 determines when the engine torque has reached an output level sufficient to transition the engine 10, e.g., the intake pressure is at an appropriately high pressure to allow proper combustion in either combustion mode. The engine controller 230 then transitions the engine 10 from one combustion mode to the other without adverse side effects of incomplete combustion such as torque disturbances, and emission spikes.

Once the engine 10 transitions from one combustion mode to the other, the engine torque request $T_E$ is reduced to match the operator torque request $T_O$. When the engine torque request $T_E$ matches the operator torque request $T_O$, the torque reclamation event and the combustion mode transition ends. It will be apparent to one of ordinary skill in the art that the above example is illustrative to help in understanding and should not be read as a limitation. For example, the motor 145 may be any suitable torque machine, e.g., mechanical or hydraulic. As another example, determining combustion mode and engine torque $T_E$ can encompass additional steps to calculate the engine torque request $T_E$ based on various engine operating criteria. As will be apparent to one of ordinary skill in the art, the disclosed control scheme 195 provides smooth operation of the hybrid vehicle during normal vehicle operation. The motor 145 is able to react torque preventing mode transition event irregularities that may be produced by the engine 10 when operating in either SI or HCCI combustion modes and switching between combustion modes.

Figure 4:
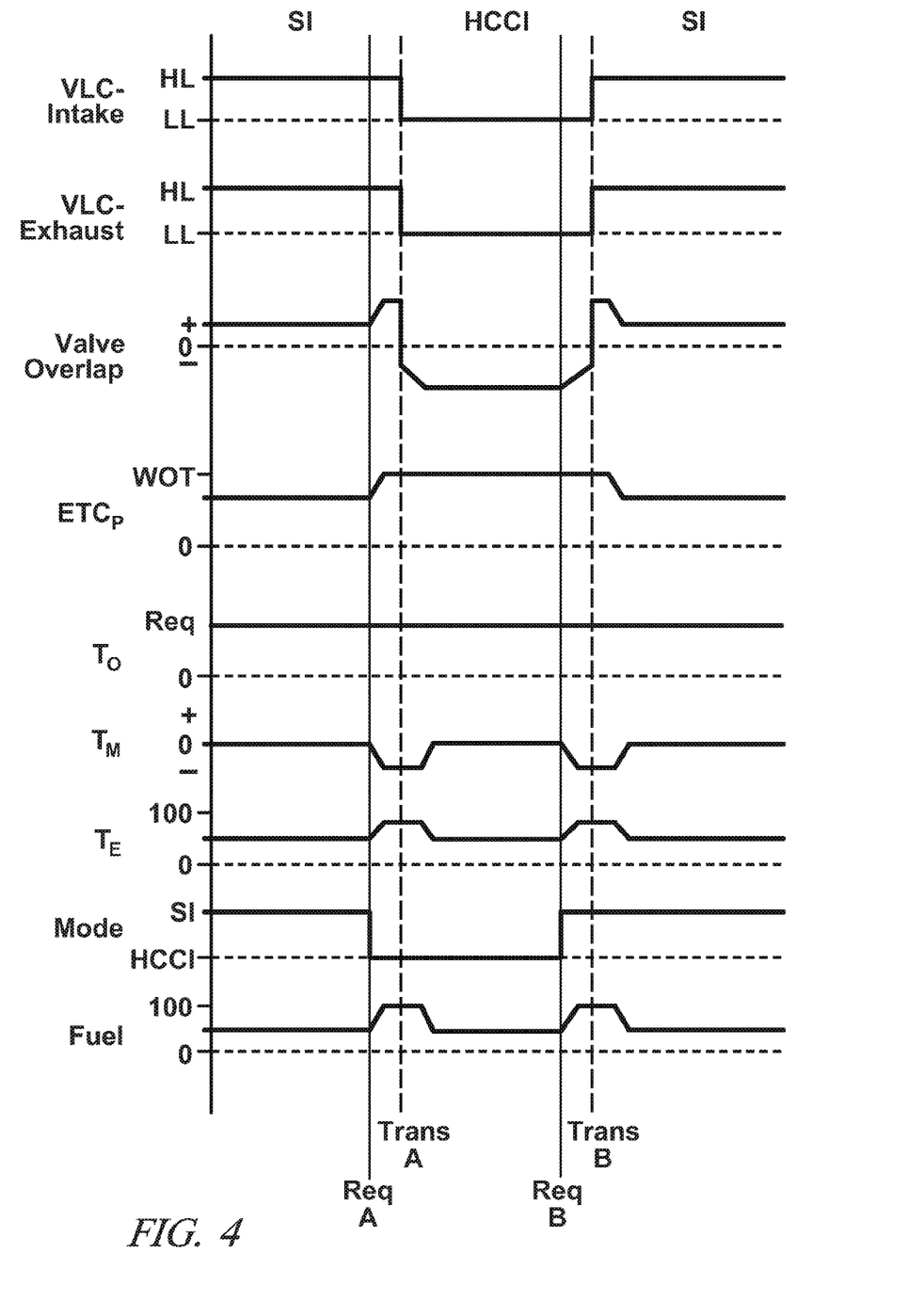
FIG. 4 is a graphical illustration of various engine parameters during a combustion mode transition, in accordance with an embodiment of this disclosure

FIG. 4 graphical illustrates the operation of the control scheme 195 during a combustion mode transition by depicting a set of engine parameter states, which include fuel, combustion mode (Mode), engine torque ($T_E$), motor torque ($T_M$), operator torque request ($T_O$), throttle control position ($ETC_P$), Valve Overlap, and valve lift control (VLC) for the intake and exhaust valves in reference to FIG. 3. The mode transition event occurs during the transition between HCCI and SI combustion modes. The transition event begins when the operator torque request $T_O$ and engine operating parameters are used to select a preferred combustion mode and an engine torque request $T_E$. The combustion mode control command is sent to the engine controller 230 for transitioning from SI combustion mode to HCCI combustion mode when appropriate based on predetermined conditions, i.e., at line Req. A, and begins a torque reclamation event. The predetermined conditions may be, for example, based on engine load and/or speed entering a predetermined operating range of HCCI combustion. The engine controller 230 adjusts the throttle control from a present SI operating position, as depicted on $ETC_P$, to the WOT position, thus requiring an increase in the amount of Fuel being received and a corresponding increase in engine torque output, as shown on the graphs Fuel and $T_E$, respectively.

As the engine torque output $T_E$ increases, the control module 5 calculates the amount of engine torque $T_E$ in excess of the operator torque request $T_O$ and sends resulting torque as a motor torque request $T_M$ to the motor control module 215 to operate the torque machine(s) 145 in electric power generation mode. The torque machine 145 reacts torque in the electric power generation mode into potential energy which can be stored within the ESD 140 and is represented as a negative torque on the graph. Therefore, although the engine torque $T_E$ contribution to the driveline increases as Fuel is increased to the engine 10, the overall tractive torque remains equal to the operator torque request, as shown at $T_O$ Req. When the engine 10 reaches WOT or when intake pressure is appropriately high to operate either combustion mode with minimal airflow disruptions, the control module 5 initiates the combustion mode transition, as described above and indicated on the graph by the dashed line at Trans A. The $ETC_P$ is at WOT therefore the intake manifold pressure is high which is an operational characteristic of operating the engine 10 in the HCCI mode. The control module 5 commands the intake and exhaust VCP/VLC systems 22 and 24 to adjust the phasings of the intake camshaft 21 and the exhaust camshaft 23 to the preferred positions. The intake and exhaust VCP/VLC systems 22 and 24 switch the intake and exhaust valves 20 and 18 from high-lift valve open positions (HL) to low-lift valve open positions (LL) resulting in a change to NVO.

Since the engine 10 is running with high airflow rate, e.g., WOT, before the combustion mode transition, combustion mode transition issues are minimized, i.e., the risk of misfires or partial burns due to imprecise air flow are reduced or eliminated. Upon completing the switch of the VCP/VLC systems 22 and 24 to the low-lift valve open position (LL), the control module 5 discontinues the mode transition event and operates the engine 10 in HCCI combustion mode. The engine 10 then reduces torque output by restricting the fuel parameter as indicated by respective graphs, $T_E$ and Fuel, as depicted right of line Trans A. As the engine torque $T_E$ approaches the operator torque request $T_O$, the torque being reacted to potential energy is reduced by a like amount, as indicated on the graph. When the engine 10 produces the operator torque request $T_O$ without need to react additional torque to generate potential energy, the torque reclamation event ends.

Transitioning from HCCI to SI combustion modes is depicted at and about dotted line Req B and dashed line Trans B. The desired engine torque determination at 205 determines a transition from HCCI to SI combustion mode is appropriate based on predetermined conditions at Req B and the control module 5 begins a combustion mode transition event. The predetermined conditions may be, for example, when the engine load and/or speed are outside of a predetermined operating range for HCCI combustion. The throttle control is at WOT, due to the HCCI combustion process, and VCP systems 22 begin decreasing NVO to the preferred value while increasing the amount of fuel to achieve stoichiometric air-fuel ratio thus increasing the amount of engine torque $T_E$ being produced to a preferred torque for smooth combustion mode transition and thereby beginning a torque reclamation event.

The control module 5 determines the amount of excess engine torque request $T_E$ over the operator torque request $T_O$ to determine motor torque $T_M$ and sends resulting torque as a motor torque request to the motor control module 215 to operate the torque machine(s) 145 in electric power generation mode to react torque to potential energy for storage in the ESD 140. Therefore, engine torque contribution to the driveline increases however, the overall tractive torque remains at the operator torque request $T_O$. The control module 5 receives the request to initiate the combustion mode transition, as described above and indicated on the graph by the dashed line at Trans B. The throttle control position $ETC_P$ is at WOT, therefore the manifold pressure is high, thereby being in an operational mode acceptable to operate in SI mode in a high load range. The intake and exhaust VCP/VLC systems 22 and 24 switch the intake and exhaust valves 20 and 18 from low-lift valve open positions (LL) to high-lift valve open positions (HL) resulting in a change from PVO from NVO and signaling the end of the combustion mode transition event and beginning the spark-ignition combustion process.

Since the engine 10 is running in WOT condition before the combustion mode transition, combustion mode transition issues are minimized, i.e., the risk of misfires or partial burns due to imprecise air flow are reduced or eliminated. The control module 5 may then modify the throttle position $ETC_P$ to reduce torque production as indicated by graphs $T_E$ and $ETC_P$ graph depicted right of line Trans B. The control module 5 commands the intake and exhaust VCP/VLC systems 22 and 24 to adjust the intake and exhaust cams accordingly as fuel mass decreases. As the engine torque $T_E$ reduction approaches the operator requested torque $T_O$ Req, the torque being reacted is reduced by a like amount, as indicated on the graph $T_M$. Eventually, the engine 10 is responsive the operator requested torque $T_O$ Req without need to react additional torque to stored energy and ending the torque reclamation event.

Alternative embodiments may include other internal combustion engines having controllable multi-step valve opening control, including those employing multi-step valve openings and/or variable cam phasing for only the intake valves or the exhaust valves and operative within a hybrid powertrain.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling operation of a hybrid powertrain system including an internal combustion engine and a torque machine configured to transfer torque to a driveline, the internal combustion engine configured to operate in one of a homogeneous charge compression-ignition combustion mode and a spark-ignition combustion mode, the method comprising:
monitoring an operator torque request;
monitoring engine operational parameters;
commanding the internal combustion engine to transition from a first combustion mode to a second combustion mode when the monitored engine operational parameters are within predefined ranges associated with operating in the second combustion mode, comprising when the engine is operating in the first combustion mode:
commanding an increase in engine torque to a predetermined operating range to allow combustion in either of the first and second combustion modes, and
commanding the torque machine to operate in a torque reclamation state comprising operating the torque machine to react a magnitude of the commanded increase in engine torque in excess of the operator torque request to generate storable electric energy;
when the engine torque has reached the predetermined operating range, executing a transition of the internal combustion engine from the first combustion mode to the second combustion mode; and
when the engine is operating in the second combustion mode comprising the homogeneous charge compression-ignition combustion mode after the executed transition from the first combustion mode comprising the spark-ignition combustion mode, commanding the decrease in engine torque by restricting the magnitude of fuel being received by the internal combustion engine.

2. The method of claim 1, wherein the homogeneous charge compression-ignition combustion mode includes operating in a low-lift engine valve open position.

3. The method of claim 1, wherein the spark-ignition combustion mode includes operating in a high-lift engine valve open position.

4. The method of claim 1, wherein commanding the increase in engine torque to the predetermined operating range corresponds to a high intake pressure operation of the engine.

5. The method of claim 4, wherein commanding the increase in engine torque comprises commanding the engine to operate at a wide open throttle condition.

6. The method of claim 1, wherein commanding the decrease in engine torque when the engine is operating in the second combustion mode after the executed transition from the first combustion mode comprises commanding the engine torque responsive to the operator torque request.

7. The method of claim 1, further comprising storing the generated storable electric energy within an energy storage device.

8. The method of claim 1, wherein commanding an increase in engine torque further comprises:
monitoring engine torque;
determining a preferred throttle opening position, a preferred fuel flowrate, and a preferred engine valve phasing associated with the commanded increase in engine torque; and
controlling the engine to the preferred throttle opening position, preferred fuel flowrate, and preferred engine valve phasing.

9. The method of claim 1, further comprising:
commanding the internal combustion engine to transition from the second combustion mode to the first combustion mode when the monitored engine operational parameters are within predefined ranges associated with operating in the first combustion mode, comprising when the engine is operating in the second combustion mode:
commanding an increase in engine torque to the predetermined operating range to allow combustion in either of the first and second combustion modes, and
commanding the torque machine to operate in the torque reclamation state comprising operating the torque machine to react a magnitude of the commanded increase in engine torque in excess of the operator torque request to generate storable electric energy;
when the engine torque has reached the predetermined operating range, executing a transition of the internal combustion engine from the second combustion mode to the first combustion mode; and
when the engine is operating in the first combustion mode comprising the spark-ignition combustion mode after the executed transition from the second combustion mode comprising the homogeneous charge compression-ignition combustion mode, commanding a decrease in engine torque by restricting a magnitude of fuel being received by the internal combustion engine.

10. A method for operating a hybrid powertrain system including an internal combustion engine and a torque machine each configured to transfer torque to a driveline responsive to an operator torque request, the engine including two-step variable lift control mechanisms configured to control magnitude of valve lift of intake and exhaust engine valves to one of two discrete steps comprising low-lift valve open positions and high-lift valve open positions, the method comprising:
commanding a switch of the two-step variable lift control mechanisms from a first of the of two discrete steps to a second of the two discrete steps during engine operation mode when monitored engine operational parameters are within predefined ranges associated with operating in the second of the two discrete steps, comprising when the two-step variable lift control mechanisms are in the first of the two discrete steps:
commanding an increase in engine torque above the operator torque request to a predetermined operating range to allow combustion in either of the two discrete steps of the two-step variable lift control mechanisms, and
commanding the torque machine to operate in a torque reclamation state comprising operating the torque machine to react a magnitude of the commanded increase in engine torque in excess of the operator torque request to generate storable electric energy; and
when the engine torque has reached the predetermined operating range, switching the two-step variable lift control mechanism from the first of the two discrete steps to the second of the two discrete steps;

when the two-step variable lift control mechanism is operating in the second of the two discrete steps comprising the low-lift valve open positions after the switch from the first of the two discrete steps comprising the high-lift valve open positions, commanding the decrease in engine torque by restricting the magnitude of fuel being received by the internal combustion engine.

11. The method of claim 10, wherein the storable energy generated during the mode transition is stored within an energy storage device.

12. The method of claim 10, wherein the switch of the two-step variable lift control mechanisms comprises a switch from the high-lift valve open position to the low-lift valve open position when the high-lift valve open position begins operation within a predefined operating range.

13. The method of claim 10, wherein switching the two-step variable lift control mechanism further comprises increasing a throttle position to maintain high pressure within an intake manifold.

14. The method of claim 10, further comprising:
commanding a switch of the two-step variable lift control mechanisms from the second of the two discrete steps to the first of the two discrete steps during engine operation mode when the monitored engine operational parameters are within predefined ranges associated with operating in the first of the two discrete steps, comprising when the two-step variable lift control mechanisms are in the second of the two discrete steps:
commanding an increase in engine torque above the operator torque request to a predetermined operating range to allow combustion in either of the two discrete steps of the two-step variable lift control mechanisms, and
commanding the torque machine to operate in a torque reclamation state comprising operating the torque machine to react a magnitude of the commanded increase in engine torque in excess of the operator torque request to generate storable electric energy; and
when the engine torque has reached the predetermined operating range, switching the two-step variable lift control mechanism from the second of the two discrete steps to the first of the two discrete steps;
when the two-step variable lift control mechanism is operating in the first of the two discrete steps comprising the high-lift valve open positions after the switch from the second of the two discrete steps comprising the low-lift valve open positions, commanding a decrease in engine torque by restricting a magnitude of fuel being received by the engine.

* * * * *